United States Patent
Dawes

(10) Patent No.: US 6,424,929 B1
(45) Date of Patent: Jul. 23, 2002

(54) METHOD FOR DETECTING OUTLIER MEASURES OF ACTIVITY

(75) Inventor: Nicholas W. Dawes, Ottawa (CA)

(73) Assignee: Loran Network Management Ltd., Bridgetown (BB)

( * ) Notice: Subject to any disclaimer, the term of this patent is extended or adjusted under 35 U.S.C. 154(b) by 0 days.

(21) Appl. No.: 09/399,373

(22) Filed: Sep. 20, 1999

(30) Foreign Application Priority Data

Mar. 5, 1999 (CA) ............................................. 2264427

(51) Int. Cl.⁷ .............................................. G06F 15/00
(52) U.S. Cl. ........................ 702/179; 370/254; 342/450
(58) Field of Search .............................. 702/45, 46, 47, 702/50, 55, 178, 182, 84, 179; 73/134; 370/235, 229, 254; 709/231; 705/164; 714/4; 342/450

(56) References Cited

U.S. PATENT DOCUMENTS 5,021,949 A * 6/1991 Morten et al. .............. 709/231
5,367,523 A * 11/1994 Chang et al. ................ 370/235
5,926,462 A * 7/1999 Schenkel et al. ............ 370/254
6,119,529 A * 9/2000 Di Marco et al. ........... 370/254

OTHER PUBLICATIONS

"On the Self–Similar Nature of Ethernet Traffic", W.E. Leland W. Willinger, M. Taqqu, D. Wilson, ACS SIF-COMM, Computer Communication Review, pp. 204–213, Jan. 1995.

* cited by examiner

*Primary Examiner*—Marc S. Hoff
*Assistant Examiner*—Mohamed Charioui
(74) *Attorney, Agent, or Firm*—Harold C. Baker; Robert A. Wilkes; Robert G. Hendry

(57) ABSTRACT

A method of detecting outliers measured during progression of an activity of an entity from one point to another point, comprising measuring activity at a point in a first dimension, measuring the same activity at the same point in at least a second dimension referenced to the same time as measuring the activity in the first dimension, and rejecting outliers which have values outside a maximum expected difference between the activity measured in the first and second dimensions.

19 Claims, No Drawings

METHOD FOR DETECTING OUTLIER MEASURES OF ACTIVITY

FIELD OF THE INVENTION

This invention relates to the field of measurement of activity of various kinds, such as (but is not restricted to) traffic in a data communication network, and more particularly to a method of measuring the activity to an improved accuracy.

BACKGROUND TO THE INVENTION

In measuring activity of various kinds, such as electrical, fluid, information, object, etc. flow, and conditions, performance, and other activities, measurements are taken at particular times. These measurements often result in the determination of outlier points, particularly in conditions where the distribution of points is unpredictable. This problem is very severe in data communication networks.

Measurements are usually made with error; a set of measurements of the same value is often normally distributed about an exact point. However, some of these measurements will have enormous errors associated with them, due to some gross experimental mistake such as recording millimeters rather than meters. The detection and rejection of these outliers can be readily made where the expected distribution of the measurements is known and has a finite variance. However, in self similar distributions the variance is infinite (or is only limited by the maximum capacity for activity of the object). Outlier points in self similar distributions cannot therefore be recognized and rejected by using the expected distribution.

Leland et al, as described in the publication "On the Self Similar Nature of Ethernet Traffic" by W. E. Leland, W. Willinger, M. S. Taqqu, D. V. Wilson: ACM SIFCOMM, Computer Communication Review: pp 204–213, January 1995, discovered that the distribution of data network traffic is self similar, so that traffic measurements made on data networks suffer from the problem of outlier rejection.

Moreover, the frequency of outliers in data networks is extremely high. When measured over a wide variety of data networks the average outlier rate was 1%, practically all of these outliers being high. These outliers make the detection of alarm levels of activity in data networks very prone to error and also makes the forecasting of activity in data network very unreliable.

The only previously known general outlier detection method is one which rejects outlier measurements if the measurement is greater than or less than a possible range of values. All other specific methods rely on knowledge of the distribution of possible values.

A complex model allows the use of more than one variable in forecasting the distribution of a single variable, where feasible. In the absence of any model, the previous distribution of a variable is the best forecaster of the future distribution of that variable. Data communications network managers very much want to know when their networks or parts of their networks will run out of capacity. It was believed for many years that models of network behaviour could predict the future; since this used to be true for voice networks, it was assumed it would be true for data. Therefore models were developed which tried to predict future peaks based on previous means and peaks.

However, the work of Leland et al referred to above, and many others subsequently, have now shown that data network traffic is self similar (fractal). This implies that the variance of data network traffic is not only infinite but also is not even related to the mean. Therefore attempting to predict future peaks using any model that includes the mean is clearly wrong.

Moreover, if the variance is truly infinite, future peaks cannot even be predicted from previous peaks. In other words, self similar distributions may have a lower limit but do not have an upper limit.

However, it had not previously been observed that since communications lines do have upper limits in capacity, therefore the distributions in them cannot be truly self similar and their variances are definitely finite. Under these conditions the previous peak values can be used to predict future peak values, but the relationship between the mean and the peak remains indeterminate.

The idea of using linear fits to prior peaks to forecast future peaks in data communications networks had been previously invented by N. W. Dawes. Once tested, however, the problem of the peaks being heavily contaminated by invalid data points was noticed. The problem rate was found by experiment to be very high, with most forecasts being significantly faulty. Moreover, attempting to report the peak activity of any port in a network (the top talker) over even the last 24 hours was found to be routinely wrong, as the following will illustrate.

Activity values recorded by data communications devices about their own activity has been found in practice to be astonishingly error prone, with an average outlier rate of 1%. For example, attempting to determine the daily peak traffic rate on a single interface by measuring the rate every minute requires measuring 1,440 points per day, but on average 14 of these would be outliers, almost all being high. The daily peak point under these conditions would be 14 times more likely to be an outlier than a genuine value. The outliers were observed to be randomly distributed, so a simple filter that rejected activity levels outside the physical capacity of the interface was added. This rejected 10,000 outliers for every 1 accepted.

However, in monitoring even moderate sized networks of 1,000 devices and 10,000 communications interfaces, about 10 outliers still passed through this filter every day (scattered over these 10,000 interfaces). This left about 4% of all forecasts seriously in error. Moreover, analyses such as finding the busiest interface even just over the last day were routinely wrong. Analysis of the immediately previous year on such a network (a not uncommon requirement) would require $3.65 \times 10^9$ points to be cleared of outliers. A far better outlier rejection method is clearly required to enable both accurate historical analysis and accurate forecasting in data communications networks.

SUMMARY OF THE INVENTION

The present invention provides a method that rejected in a successful prototype approximately $10^{15}$ outliers for every 1 accepted (in Ethernet networks), while rejecting effectively no genuine points. The invention provides similar performance on ATM, Frame Relay and other protocol based data communications networks. The present invention therefore renders practical and effective the linear forecasting method mentioned above, surprisingly only requiring use of peak data. The method can be used as a filter for the measured points.

It is an important aspect of the present invention that it does not rely on knowledge of the distribution of possible values. It provides very reliable detection and rejection of outliers and so enables very significant improvements in the accuracy of both alarm detection and activity forecasting.

The present invention has application to all fields that involve the measurement of self similar activity and all fields in which measurable activity flows from one object to another. The set of fields with self similar distributions to which the present invention has application is enormous. Therefore the small fraction of those given as examples in this specification are only some of those in which the present invention has applicability. Further, the set of fields which include measurable flows is similarly vast. The embodiments described herein should only be taken as representative of those applications, and the present invention is applicable to all such fields.

In accordance with an embodiment of the present invention, a method of detecting outliers measured during progression of an activity of an entity from one point to another, comprises measuring activity at a point in a first dimension, measuring the same activity at the same point in a second dimension at the same time as measuring the activity in the first dimension, and rejecting outliers which have values outside a maximum expected difference between the activity measured in the first and second dimensions.

DETAILED DESCRIPTION OF PREFERRED EMBODIMENTS OF THE INVENTION

The invention requires that a particular activity should be measured at the same time using different devices in different dimensions. If the two measurements disagree by more than a maximum experimental difference expected between these devices, an outlier is declared to have been detected. The maximum acceptable experimental difference is now not related to the variance with time of the measured activity. Two examples will now be given: the first uses the dimension of distance, the other uses other dimensions.

(a) Consider the traffic to be flowing from point A to point B, wherein the traffic leaving point A is the same as that arriving at point B. Therefore measuring the flow rate both at point A and at point B is the same as measuring the flow rate twice at point A, simultaneously, after adjusting for the time of flight.

This general method requires prior knowledge that A is connected to B, which can be determined by a general method, such as that described in the U.S. Pat. No. 5,926,462 issued Jul. 20, 1999 entitled Method of Determining Topology of a Network of Objects", invented by N. W. Dawes, D. Schenkel and M. Slavitch.

(b) Consider the traffic flow from point A. The flow rate should be measured in two dimensions at once at point A. Adjusting for the ratio or difference in dimensions, this too is equivalent to measuring the flow rate twice. For example, in data networks a pair of such dimensions is bytes/second and frames/second.

In a given medium type, the maximum and minimum ratios of bytes per frame are defined by standards. In Ethernet media there can only be between 64 and 1500 bytes per frame. Therefore if the ratio of the measurements of flow in bytes per second to frames per second falls outside the range 64 to 1500, an outlier has been detected.

A novel aspect of the embodiment in which synchronized measurements are made in different dimensions is that of the requirement of different dimensionality.

Embodiments of the invention will be described below. Reference is made to the following definitions, in which:

$e_i$: the experimental error in measuring a single value of the variable W at object i.

$E_i$: the experimental error in measuring a single value of the variable V at object i.

$f_{ij}$: the expected ratio of variable V from object i to object j such that $V_i = V_j f_{ij}$ (e.g. in a sealed constant temperature pipe and measuring a flow of water: $f_{ij}=1$).

i: an index which describes which object is referred to (e.g. i=x).

Max: the maximum possible value for $V_x$ (e.g. from the line capacity).

Min: the minimum possible value for $V_x$ (often zero)

N: the number of standard deviations by which two measures of $V_i$ disagree.

R: the ratio of $V_i$ to $W_i$ (e.g. the measured ratio of bytes to frames at object x).

RatioMax: the maximum ratio of $V_i$ to $W_i$ (if $V_i$>0). (e.g. 1500 is the maximum ratio of bytes to frames in Ethernet media).

RatioMin: the minimum ratio of $V_i$ to $W_i$ (if $V_i$>0); (e.g. 64 is the minimum ratio of bytes to frames in Ethernet media).

$T_{ij}$: the time of flight from object i to object j.

$V_i$: the value of the variable as measured at object i (e.g. $V_a$ is the value to be checked).

$W_i$: the value of a variable W related to V is measured at object i. (e.g.: $64 V_i <= W_i <= 1500 V_i$)

x: the object whose measurement of V is to be checked.

y: an object connected to the object x by a medium that carries the activity which is measured by V. (e.g. if the activity was water flow, the medium could be a pipe).

The variables V and W are measured as follows.

In data communications networks, SNMP (Simple Network Management Protocol) is generally available. Some other method of accessing information within a device could be used: e.g. Telnet, HTML, CMIP, XML, CIM. The traffic counters for frames and for bytes are generally stored in the standard portion of the MIB (Management Information Base) tables of each port for each managed object in such a network. By requesting the counters for frames and the counters for bytes at the same time, and again requesting these counters synchronously at a later time, the change in frames per second and the change in bytes per second during the interval can be determined for this object. W would then represent frames/second and V would represent bytes/second.

In other applications W and V would represent other paired variables. For example, in an fluid system W could be the total volume that passed through a portion of pipe in a period of time and V the total mass that passed, with the density of the fluid constrained to a given range.

The expected errors $E_i$ and $e_i$ can be determined in advance by measuring the appropriate variable (V or W) using multiple instances of the equipment at the same time at object i. Alternatively the errors can be theoretically determined by examining the tolerances of the measurement equipment.

In data communication networks the errors were found to have a common value of 0.5, so long as careful synchronization of measurements was adhered to. Therefore a standard value of 0.5 could be used for Ei and ei. It is believed that this common value is used perhaps due to poor software libraries in common use.

A method of exploiting a connection between objects follows.

Let x and y be connected.

Let $V_y$ be measured $T_{xy}$ later in time than $V_x$.

The expected variance in: $(V_x - V_y f_{xy})$ is $(E_x^2 + E_y^2 f_{xy}^2)$.

The number of standard deviations difference between $(V_x - V_y f_{xy})$ is therefore:

$$N = |V_x - V_y|/(E_x^2 + E_y^2 f_{xy}^2)^{1/2} \qquad 1$$

By choosing a maximum value of N (e.g. 10 standard deviations), $V_x$ can be declared an outlier if N is greater than this maximum. Expressed in different terms: should N be found to be greater than a selected threshold, the pair of values $V_x$ and $V_y$ are declared to be outliers. Both are rejected as the expression is symmetric with respect to both.

The false negative rate of this method can be estimated. The false negative rate is the probability a correct point will be wrongly identified as an outlier.

Except for the outliers, $V_x$ is usually normally distributed. This is due to the fact that $V_x$ is being measured several ways at the same time. Even if $V_x$ has a non-normal distribution with time, the distribution of these several synchronized measurements of a single value will usually be normally distributed with a mean corresponding to the true value. This is where the synchronization of the measurements transforms a problem in which the distribution is unknown to one in which the distribution will usually be normal.

Therefore N above is directly related to the probability that a correct point will be rejected. Most statistical textbooks give the normal curve areas which can be used to determine this probability (e.g. as described in the publication "Statistical tables and Formulas" (Table I) by A. Hald, (New York: John Wiley 1952). However, by choosing a very large value of N indeed, the false negative rate can be made effectively zero. In trying to determine peak levels of activity, avoiding false negatives which would reject true peaks is very important.

For example:

N=3 gives a false negative rate of 0.002, but N=10 gives a false negative rate that can be ignored.

The false positive rate is failure to identify a true outlier. Assuming that the outliers are distributed uniformly (which appears to be the case in data communications networks) and that the basic rejection of outliers with values<Min and values>Max has been accomplished, the relationships are as follows.

The outlier is chosen from a value in the range Min . . . Max.

The acceptable values for $V_x$ lie in the range $$V_y - N (E_x^2 + E_y^2 f_{xy}^2)^{1/2} <= V_x <= V_y + N (E_x^2 + E_y^2 f_{xy}^2)^{1/2} \qquad 2$$

The probability P that $V_x$ will lie in this range by chance is:

$$P = 2N (E_x^2 + E_y^2 f_y^2)^{1/2}/(\text{Max} - \text{Min}) \qquad 3$$

Since P is inversely proportional to Max, it is preferred that the speed of the network should be as high as possible.

For example, choosing values reasonable in a data communication network:

N=10

$$E_x^2 + E_y^2 f_{xy}^2 = 1$$

Max=200,000 (frames/second)
Min=0 (frames/second)
then:
P=0.0001 (a 10,000:1 rejection rate).

This method can be combined with the others described herein (and otherwise) as described later with respect to use of filters in combination, which leads to a combined example value of

P=$10^{-15}$

To exploit measurements in 2 different dimensions:

Let $V_x$ and $W_x$ be measured at the same time on the object x.

The ratio R $(V_x/W_x)$ is expected to be in the range Ratiomin to Ratiomax.

The number of standard deviations by which they disagree is N where:

if R is <Ratiomin:

$$N = |V_x - W_x \text{ Ratiomin}|/(E_x^2 + e_x^2 \text{ Ratiomin}^2)^{1/2} \qquad 4$$

if Ratiomin<=R<=Ratiomax $$N = 0 \qquad 5$$

if R is >Ratiomax:

$$N = |V_x - W_x \text{ Ratiomax}|/(E_x^2 + e_x^2 \text{ Ratiomax}^2)^{1/2} \qquad 6$$

By choosing a maximum value of N (e.g. 10 standard deviations), $V_x$ can be declared an outlier if N is greater than this maximum. Expressed in different terms: should N be found to be greater than a selected threshold, the pair of values $V_x$ and $W_x$ are declared to be outliers. Both are rejected as the method is symmetric with respect to both.

The false negative rate of this method can be estimated as described earlier.

The false positive rate of this method is estimated as follows. As noted earlier, the false positive rate is failure to identify a true outlier. Assuming the outliers are assumed to be distributed uniformly (which appears to be the case in data communications networks) and that the basic rejection of outliers with values >Max has been accomplished, the relationships are as follows.

The acceptable ratios for $V_x:W_x$ lie in the range Ratiomin . . . Ratiomax (since the errors E can usually be ignored as they extend this range only very slightly).

Given a value of $V_x$, the set of possible values for $W_x$ will be chosen at random from the range Min to Max.

The probability P that $V_x$ will lie in this permitted range by chance is approximately:

$$P = W_x (\text{Ratiomax} - \text{Ratiomin})/(\text{Max} - \text{Min}) \qquad 7$$

Since P is inversely proportional to Max, it is preferred that the speed of the network should be as high as possible.

For example, choosing values for an Ethernet data communication network, and checking the value of frames/second $(V_x)$ from the value of bytes/second $(W_x)$:

| | |
|---|---|
| $W_x$ = 12,000 | (bytes/second) |
| Ratiomax = 1/64 | (frames/bytes) |
| Ratiomin = 1/1500 | (frames/bytes) |
| Max = 200,000 | (frames/second) |
| Min = 0 | |
| then: | |
| P = 0.001 | (a 1000:1 rejection rate). |

This method can be combined with the others described herein (and otherwise) and as described below with regard to use of filters in combination, which leads to a combined example value of

P=$10^{-15}$

With regard to measurements in m (>2) different dimensions.

Let $V_x$ and $W_{x,1...m}$ be measured at the same time on the object x.

Let the following relationship hold:

$V_x = \Sigma_{i=1..m} a_i W_{x,i}$

Let N be the number of standard deviations by which this relationship is violated in the set of synchronous measurements of V and W made on x where:

$$N = |V_x - \Sigma_{i=1..m} a_i W_{x,i}| / (E_x^2 + \Sigma_{i=1..m} a_i e_{x,i}^2)^{1/2} \qquad 8$$

By choosing a maximum value of N (e.g. 10 standard deviations), $V_x$ can be declared an outlier if N is greater than this maximum. Expressed in different terms: should N be found to be greater than a selected threshold, the set of values $V_x$ and $W_{x,i}$ are declared to be outliers. The set is rejected as the method is symmetric with respect to all members of the set.

In Ethernet networks, the following relationship holds:

frames=broadcasts+unicasts−errors.

Therefore simultaneously measuring the frame rate, the broadcast rate, the unicast rate and the error rate allows their substitution into relationship 8 above.

The false negative rate of this embodiment is determined as described above.

As noted earlier, the false positive rate is failure to identify a true outlier. Assuming that the outliers are distributed uniformly (which appears to be the case in data communications networks) and that the basic rejection of outliers with values >Max has been accomplished, these relationships follow.

The outlier is chosen from a value in the range Min . . . Max.

Letting:

$Q = \Sigma_{i=1..m} a_i W_{x,i}$

The acceptable values for $V_x$ lie in the range $$Q - N (E_x^2 + \Sigma_{i=1..m} a_i e_{x,i}^2)^{1/2} \leq V_x \leq Q + N (E_x^2 + \Sigma_{i=1..m} a_i e_{x,i}^2)^{1/2} \qquad 9$$

The probability P that $V_x$ will lie in this range by chance is:

$$P = 2N (E_x^2 + \Sigma_{i=1..m} a_i e_{x,i}^2)^{1/2} / (Max - Min) \qquad 10$$

Since P is inversely proportional to Max, it is preferred that the network should have the highest possible speed.

For example, choosing values reasonable in a data communication network:

$N = 10$ $$\left(E_x^2 + \sum_{i=1...m} a_i e_{x,i}^2\right)^{1/2} = 1$$

Max = 200,000 (frames/second)
Min = 0 (frames/second)
then:
$P = 0.0001$ (a 10,000: 1 rejection rate).

This embodiment can be combined with the others described herein (and otherwise) and as described below using filters in combination, which leads to a combined example value of $P = 10^{-15}$ Filter methods can be used in various combinations, with the combined rates being the product of the individual rates. Methods can be combined so long as the combinations of variables does not repeat combinations that have already been applied in combination. For example, suppose the frame rate (F) and byte rate (B) are simultaneously measured at two ends of a line (x and y). The following three cases can be used in filters, using the methods described above for exploiting measurements in two different dimensions in the first case, and exploiting a connection between objects in the second and third cases:

$F_x$ against $B_x$
$F_x$ against $F_y$
$B_x$ against $B_y$

But now $F_y$ cannot be used to further filter $B_y$ since this is already implied by the combination above.

The following definitions are used in the description below:

$r_i$=false negative rate from method i.
R=false negative rate from methods 1..m combined.
$S_i$=false positive rate from method i.
S=false positive rate from methods 1..m combined. then:

$$R = \Pi_{i=1..m} r_i \qquad 11$$

$$S = \Sigma_{i=1..m} s_i \qquad 12$$

For example, should only the methods described above exploiting the measurements in two and in more dimensions be applied to an Ethernet interface (not using the topological method perhaps because the connection was just changed):

$R = 0.001 \times 0.0001 = 10^{-7}$

If the topological method for exploiting a connection between objects were used as well:

$R = 0.001 \times 0.0001 \times 0.0001 = 10^{-11}$

If coupled to the simple filter, that rejects points outside the capacity of the interface:

$R = 10^{-11} \times 10^{-4} = 10^{-15}$

Since in testing the outliers appeared to be scattered uniformly across the entire range of values permitted by the number of bits in the counter, the larger the ratio of the maximum value storable in the counter to the maximum physical value possible, the better these filter methods were found to work. For example, in SNMP, 32 bit counters are used which can represent numbers with a range of 0 to $4 \times 10^9$. In SNMP v2 64 bit counters are used which provides a range of 0 to $1.6 \times 10^{19}$. Operating on the same problem conditions, the larger counters would therefore provide far better filtering performance than the smaller ones.

While the description above is to a general method for discovering outliers, it should be noted that the objects which have measurements made upon them could be physically discrete (e.g. communications devices), conceptually discrete (e.g. arbitrarily chosen volumes in a solid) or merely points of reference (e.g. locations in a pipe).

The following are some examples of what can be measured. If the topologies are known, this also enables the topological dependent filter described above to be used. Dawes et al, in the patent referred to earlier, describe a general method for topological determination which covers these and other examples. The determination of activity can then be used for model discovery, for diagnosis, description or for other purposes.

Embodiments of the invention can be applied to measurement of:

a: Electrical activity in neurons or neuronal regions of the brain.

b: Electrical signals and information transfers in communications systems: data, voice and mixed forms in static, mobile, satellite and hybrid networks.

c: Volume flow of fluids: for plumbing, heating, cooling, nuclear reactors, oil refineries, chemical plants, sewage networks, weather forecasting, flows in and from aquifers, blood circulation (especially in the heart); other biological fluids, sub intra and supra tectonic flows of lava, semisolids and solids.

d: Flow of information or rates of use in software systems and mixed software/hardware systems.

e: Object flows: fish, bird and animal migration paths, tracks and routes of vehicles.

f: Heat flow; partitioning a surface or volume up into elements, one can describe the flow vectors of heat through the elements and hence deduce a probabilistic flow network. The measured attribute could be direct (e.g. black body emission signature) or indirect (e.g. electrical resistance).

g: Nutrient and nutrient waste flow; certain nutrients get consumed more rapidly by rapidly growing parts (e.g. cancers) than by other parts. The flow of nutrients will tend to be abnormal towards such abnormal growths and similarly the flow of waste will be abnormally large away from them.

h: Improved alarm condition detection and forecasting in data communications.

i: Measurement of the performance of economic and system operational models, leading to discovery of ways to change, influence, direct or improve them. For example, stock market distributions appear to be self similar as do other economic related distributions.

The above list indicates a large number of potential applications, although additional other applications can be determined by a person understanding the invention. The following general list indicates fields in which the invention can be used, although additional fields can be determined by person understanding the invention:

biological diagnosis, model discovery and validation;
volcanic eruption and earthquake prediction;
refinery operations startup modeling for replication;
operational efficiency improvements by spotting bottlenecks and possibilities for shortcuts (in organizations and systems).

A person understanding the above-described invention may now conceive of alternative designs, using the principles described herein. All such designs which fall within the scope of the claims appended hereto are considered to be part of the present invention.

I claim:

1. A method of rejecting outliers measured during progression of an activity of an entity from a first point to second point, comprising measuring activity at the first point in a first dimension, measuring the same activity at the first point in a second dimension referenced to the same time as measuring the activity in the first dimension, and rejecting outliers which have values outside a maximum expected difference between the activity measured in the first and second dimensions.

2. A method as defined in claim 1 in which the step of measuring activity is comprised of measuring a traffic flow rate at the first point at the same time with respect to two different forms of values.

3. A method as defined in claim 2 in which the traffic is data, and in which the two different forms of values are bytes per second and frames per second.

4. A method as defined in claim 3 in which the maximum expected difference is at least one of upper and lower limits of bytes per frame.

5. A method as defined in claim 4 in which said limits are in accordance with a transmission standard.

6. A method as defined in claim 3 in which the maximum expected relationship is at least one of upper and lower limits of changes in at least one of bytes per second and frames per second over an interval of time.

7. A method as defined in claim 3 including determining the traffic flow from byte and frame traffic counters in a data terminal at said first point.

8. A method as defined in claim 1 including declaring a measurement $V_x$ to be an outlier in the event a standard deviation N of the measurement is in excess of a predetermined threshold, wherein x is an object connected to another object y by a medium which carries an activity which can be measured, $V_x$ and $V_y$ are values of variables as measured at respective objects x and y, $T_{xy}$ is a time interval after the measurement of Vx that $V_y$ is measured, $E_x$ and $E_y$ are experimental errors in measurement of single values of $V_x$ and $V_y$ respectively, $f_{xy}$ is an expected ratio of $V_x$ and $V_y$ from object x to object y such that $V_x=(V_y)*(f_{xy})$, and $N=|V_x-V_y|/(E_x^2+E_y^2*f_{xy}^2)^{1/2}$.

9. A method as defined in claim 8 in which acceptable values for $V_x$ lie in the range:

$V_y-N(E_x^2+E_y^2*f_{xy}^2)^{1/2}<=V_x<=V_y+N(E_x^2+y^2*f_{xy}^2)^{1/2}$.

10. A method as defined in claim 9 used as a data filter for rejecting data which is outside said range.

11. A method as defined in claim 8 in which N has a value which is greater than substantially all true measurement peaks of $V_x$ and $V_y$.

12. A method as defined in claim 8 wherein the activity measured is flow rate of data in a communication network, and N is substantially 10.

13. A method as defined in claim 8 in which either one of $V_x$ and $V_y$ is one of:

a: Electrical activity in neurons or neuronal regions of the brain, b: Electrical signals and information transfers in communications systems comprised of at least one of data, voice and mixed data and voice in at least one of static, mobile, satellite and hybrid networks, c: Volume flow of fluids in at least one of pipelines, plumbing systems, heating systems, cooling systems, nuclear reactors, oil refineries, chemical plants, sewage networks, the atmosphere, oceans, lakes, waterways, liquid flows in and from aquifers, blood circulation, biological fluids, sub intra and supra tectonic flows of lava, semisolids and solids, d: At least one of flow of information and rates of use of data in software systems or mixed software and hardware systems, e: Object flows comprising at least one of fish, birds and animals in migration, tracks and routes of vehicles, f: Heat flow, flow of electricity, g: Nutrient and nutrient waste flow in a living body h: Alarm conditions, and i: Units in self-similar economic systems.

14. A method as defined in claim 1 in which the step of measuring activity is comprised of measuring a total volume of a fluid that has passed through a portion of a pipe during a period of time as the first dimension, and measuring a total mass of the fluid that has passed through the same portion of the pipe during the same period of time as the second dimension.

15. A method as defined in claim 14 in which said maximum difference is comprised of a predetermined range of a density of the fluid determined from the measurements of the total volume and total mass.

16. A method as defined in claim 1, in which the step of measuring in a first dimension is conducted using a first device, and the step of measuring in a second dimension is conducted using a second device.

17. A method as defined in claim 1 in which the first point is a source of data and in which the second point is a destination for all of the data from the source of data, the step of measuring activity in a first dimension being comprised of measuring a traffic flow rate at the first point at a particular time, and the step of measuring activity in a second dimension is comprised of measuring traffic flow rate at the second point at a time delayed from the particular time equal to the data transmission delay time between the first and the second point.

18. A method as defined in claim 1 in which the step of measuring activity is comprised of measuring paired variables referenced to the same time.

19. A method as defined in claim 1 in which the step of measuring activity is comprised of measuring changes in paired variables referenced to a pair of instants in time.

* * * * *